United States Patent [19]

Hwang et al.

[11] Patent Number: 5,640,287
[45] Date of Patent: Jun. 17, 1997

[54] SLANT POST BASE MOUNTING MECHANISM FOR A MAGNETIC RECORDING AND REPRODUCING APPARATUS

[75] Inventors: Haksun Hwang; Ingi Cheon, both of Seoul; Sang Jig Lee, Kyungki-Do; Pohyoung Koh, Kyungki-Do; Hyeoksoo Park, Kyungki-Do; Sungwoo Choi, Kyungki-Do; Sung Hwan Hong, Seoul, all of Rep. of Korea

[73] Assignee: LG Electronics, Inc., Seoul, Rep. of Korea

[21] Appl. No.: 438,547

[22] Filed: May 10, 1995

[30] Foreign Application Priority Data

May 19, 1994 [KR] Rep. of Korea ............... 11130/1994

[51] Int. Cl.[6] ............................................. G11B 15/61
[52] U.S. Cl. ............................................. 360/85
[58] Field of Search ............................. 360/84, 85, 95; 242/346, 346.1; 206/389, 387.1, 387.14

[56] References Cited

U.S. PATENT DOCUMENTS

| | | | |
|---|---|---|---|
| 5,363,257 | 11/1994 | Matsuoka | 360/85 |
| 5,365,386 | 11/1994 | Konishi et al. | 360/85 |

*Primary Examiner*—John H. Wolff
*Assistant Examiner*—George J. Letscher

[57] ABSTRACT

A slant post base mounting mechanism for a magnetic recording and reproducing apparatus includes a support for preventing movement of an adjusting screw, the support having an elastic member mounted on upper surface thereof and a plate spring formed with a clamp shaped, a v-type stopper having holes formed on an upper and a vertical surfaces thereof, respectively. Also, the plate spring includes a guide portion formed on a lower surface thereof, the guide portion being in contact with the protrusion of the slant post base in order to support the adjusting screw, and a slant portion formed at an end of the guide portion, the slant portion being movably inserted in a hole formed at a vertical surface of the V-type stopper.

10 Claims, 3 Drawing Sheets

SLANT POST BASE MOUNTING MECHANISM FOR A MAGNETIC RECORDING AND REPRODUCING APPARATUS

BACKGROUND OF THE INVENTION

1. Field of the Invention

The present invention relates to a slant post base mounting mechanism for a magnetic recording and reproducing apparatus. More particularly, the present invention relates to an improvement of the slant post base mounting mechanism for correctly guiding the slant post base and maintaining a slant post base at a right angle in order to prevent from moving freely of an adjust screw.

2. Description of the Conventional Art

In a magnetic recording and reproducing apparatus as shown in FIG. 1, a head drum 1 is arranged on a drum base 2 which forms with a base plate (not shown). Loading guide grooves 3 are provided in the drum base 2 on opposite sides of the head drum 1. Also, the loading guide grooves 3 positioned on the base plate are symmetrical to each other.

As shown in FIG. 1, a plurality of tape loading posts 8 vertically project from slant post bases 4 guided through the guide grooves 3, and have cylindrical surfaces at the lower end thereof. A tape is guided along the loading guide grooves 3 according to the movement of the slant post base 4.

V-type stoppers 6 having mounting grooves 6a are provided at ends of both of the guide grooves 3 in order to regulate the movement of the slant post bases 4.

Also, guide rollers 10 are located at the both sides of the upper surfaces of each of the slant post bases 4. A pair of slant posts 9 are also fixed at predetermined portions of the upper surfaces of the slant post bases 4.

Generally, in the magnetic recording and reproducing apparatus, such as a 8 mm camcorder, it becomes necessary to maintain the slant post base 4 at a right angle and to correctly locate a mounting groove 6a of the V-type stopper 6 in order to provide clear and accurate picture quality on the screen.

Now, a typical embodiment of the conventional slant post base mounting mechanism will be described hereinafter.

Referring to FIGS. 1 and 2, a pair of adjusting screws 11 are inserted to the V-type stopper 6 and lower surface of the adjusting screw 11 in FIG. 2 in such a way that they diverge toward a protruded supporting portion 12. The protruded supporting portion 12 is located at an upper surface of the slant post base 4.

The slant post base 4 contacts with the mounting groove 6a of the V-type stopper 6, and the lower surface of the adjusting screw 11 also contacts the protruded supporting portion 12 of the slant post base 4, thereby guiding the slant post base 4.

In case with adjusting a right angle of the adjusting screw 11, the protruded supporting portion 12 is contacted with the lower surface 11a of the adjusting screw 11. At this time, the slant post base won't quite reach at a predetermined position because an abrasion occurs between the lower surface 11a of the adjusting screw 11 and the protruded supporting portion 12 of the slant post base 4.

This type of the conventional slant post mounting mechanism has no means for preventing free movement of the adjusting screw 11, so that the slant post base 4 can not be maintained at the right angle and thus a predetermined angle of the slant post base 4 is deviated.

In order to prevent the deviation of a direction angle of the slant post base 4, it is necessary to utilize a fastening compound.

As a result, there are problems associated with the increase of the manufacturing cost.

SUMMARY OF THE INVENTION

Accordingly, it is an object of the present invention to provide a slant post base mounting mechanism for guiding a slant post base upon finishing a final loading operation.

It is other object of the present invention to provide a slant post base mounting mechanism for preventing movements of an adjusting screw and for maintaining an exact right angle state of the slant post base.

In accordance with an aspect of this invention, a slant post base mounting mechanism includes a supporting means for preventing movement of the adjusting screw, the supporting means having an elastic member mounted on an upper surface thereof, a plate spring means formed with a clamp shape and, a v-type stopper having holes formed on an upper and a vertical surface thereof, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DESCRIPTION OF THE PREFERRED EMBODIMENTS

An embodiment of the present invention will be described in detail below with reference to the accompanying drawings.

Figure 1:
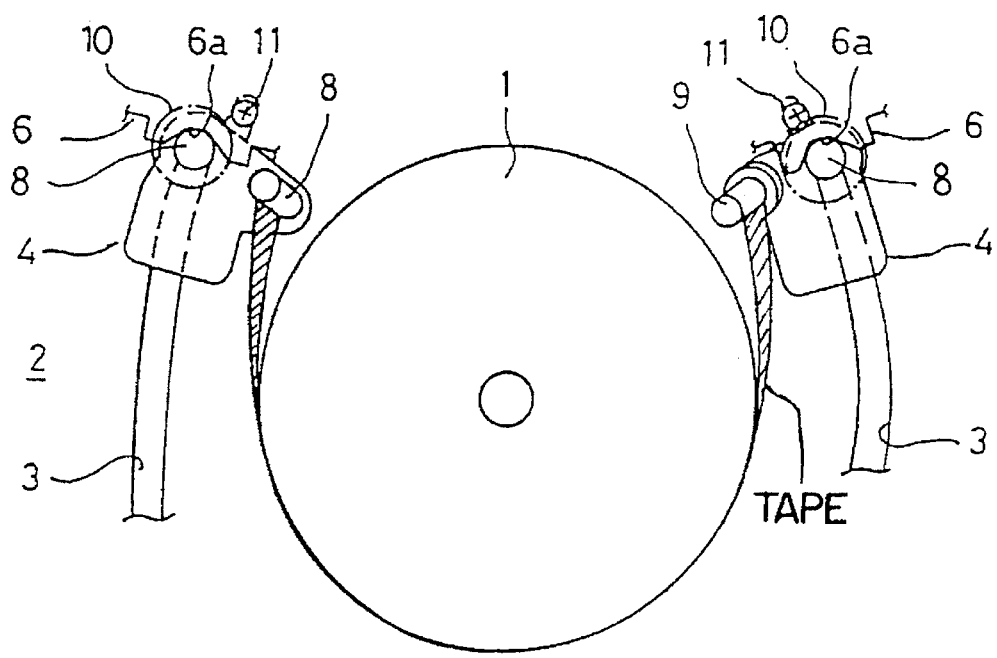
FIG. 1 is a plan view illustrating a final loading state of a conventional recording and reproducing apparatus.
Figure 2:
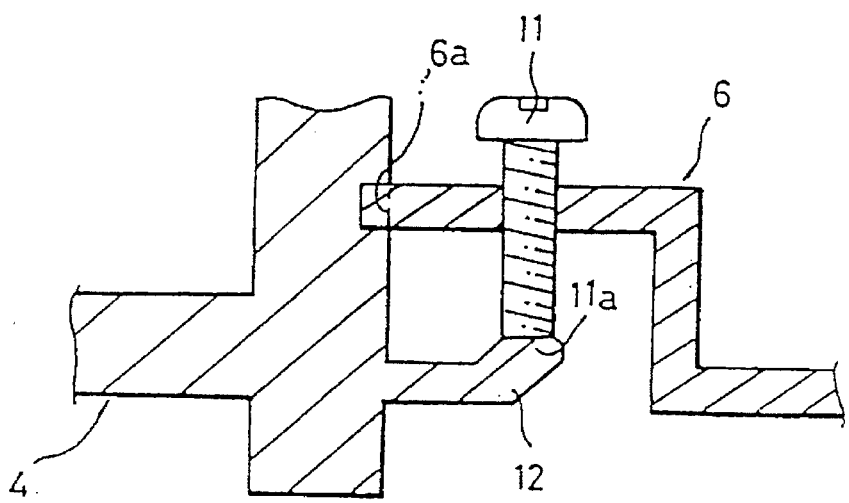
FIG. 2 is a cross sectional view showing a slant post base mounting mechanism of a conventional recording and reproducing apparatus.
Figure 3:
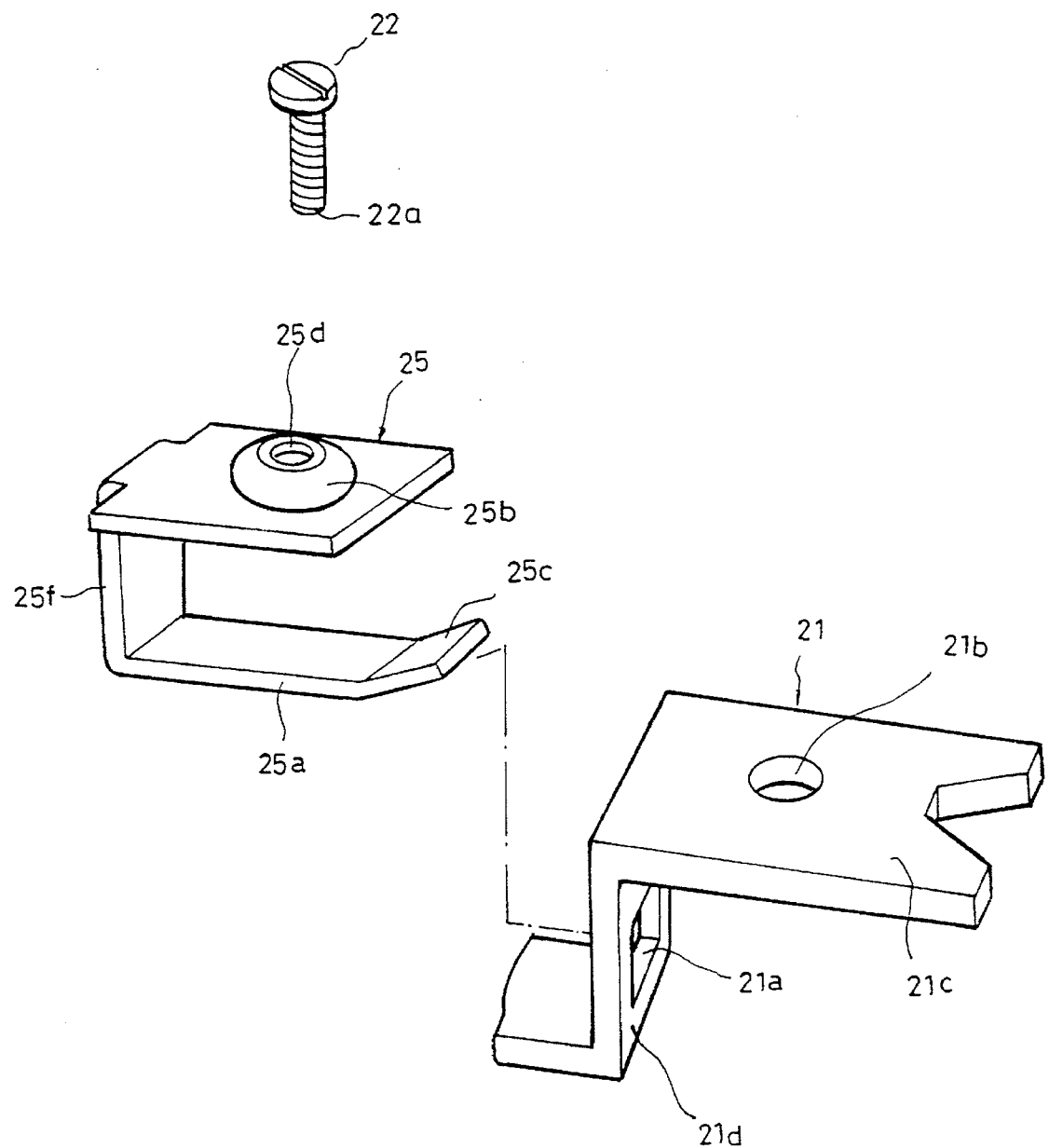
FIG. 3 is an exploded perspective view showing a slant post base mounting mechanism according to the present invention.

FIGS. 3 shows a schmetric perspective view according to an embodiment of the present invention.

Referring to FIG. 3, a slant post base mounting mechanism of a recording and reproducing apparatus according to the present invention includes an adjusting screw 22, a supporting means 25 and a V-type stopper 21.

The supporting means 25 includes an elastic member 25b and a plate spring means 25f formed with a clamp type. As best shown in FIG. 3, the elastic member 25b is provided on the upper surface of the plate spring means 25f. Also, a screw insertion hole 25d is formed at a center of the elastic member 25b. In the plate spring means 25f, the lower surface includes a flat guide portion 25a and a slant portion 25c connected with the end of the guide portion 25a.

In the V-type stopper 21, a hole or opening 21b is provided in the center of the upper surface 21c and a rectangular type hole 21a is provided in a vertical surface 21d.

The adjusting screw 22 is threadably engage with an insertion hole 25d and a hole 21b. Also, the adjusting screw 22 is adapted to move vertically via the screw insertion hole 25d of the elastic member 25b and the hole 21b of the V-type stopper 21.

Figure 4:
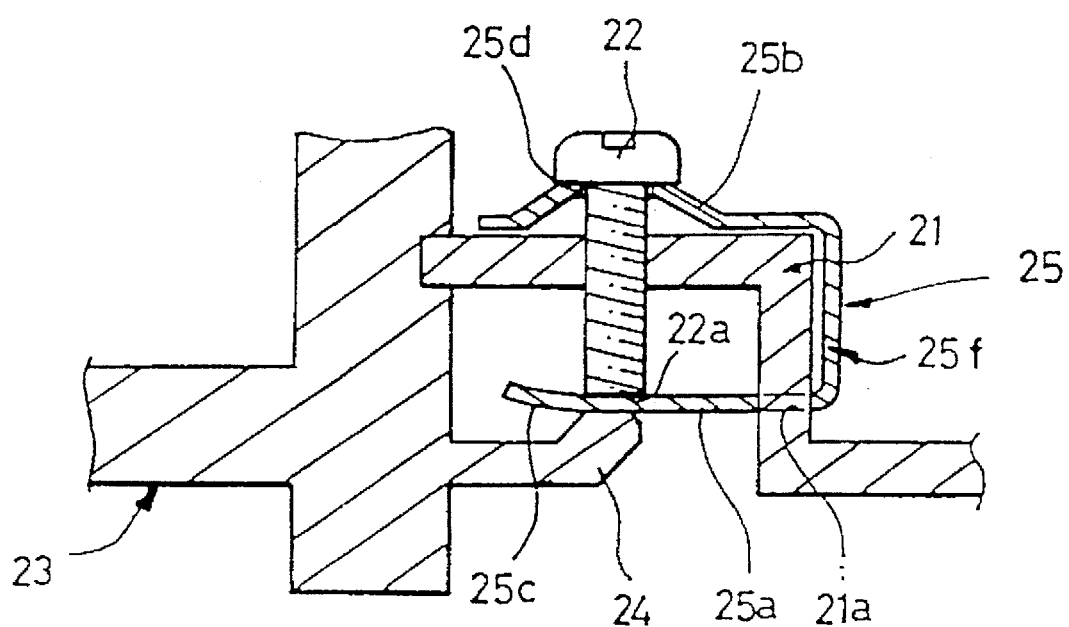
FIG. 4 is a cross sectional view showing a slant post base mounting apparatus engaged with a slant post base and a V-type stopper.

FIG. 4 is a cross sectional view illustrating a supporting means engaged at a slant post base and a V-type stopper.

The supporting means 25 according to the embodiment of the present invention is fixed to the V-type stopper 21 for preventing movement of the adjusting screw 22, and for guiding movement of the slant post base 23.

The supporting means 25 is a plate spring formed with a clamp type shape. Also, a bottom surface 22a of the adjusting screw 22 is contacted with the guide portion 25a of the supporting means 25. Thus, when the adjusting screw 22 is completely inserted as shown in FIG. 4, the bottom surface 22a of the adjusting screw 22 is supported by the guide portion 25a of the supporting means 25 located at a protrusion 24 of a slant post base 23.

An operation of the slant post base mounting mechanism according to the embodiment of the present invention will be explained below.

First, the guide portion 25a of the supporting means 25 is inserted onto the rectangular type hole 21a of the V-type stopper 21.

As shown in FIG. 3, the adjusting screw 22 is inserted through the screw insertion hole 25d of the elastic member 25b and the hole 21b of the V-type stopper 21. The adjusting screw 22 is threadably engaged with the screw insertion hole 25d and the hole 21b, respectively.

After completing the assembling, thereof, an elastic force of the elastic member 25b is upwardly directed and prevents undesired movement of the adjusting screw 22.

As shown in FIG. 4, the slant post base 23 is located in a mounting groove (not shown) of the V-type stopper 21 upon completing a tape loading operation. At this time, the protrusion 24 of the slant post base 23 is guided at the guide portion 25a formed at lower surface of the plate spring means 25f, so that the plate spring means 25f moves smoothly. Since a slant portion 25c is formed at the end of the guide portion 25a, the protrusion 24 does not directly contact the bottom surface 22a of the adjusting screw 22.

Also, in case of adjusting an angle of the slant post base 23, the adjusting screw 22 is easily adjusted by rotation thereof because the adjusting screw 22 is tightly engaged by the elastic force of the elastic member 25b.

At this time, the elastic member 25b of the supporting means 25 is able to prevent unexpected lifting movements of the adjusting screw 22.

As mentioned above, according to the present invention, the slant post base mounting mechanism is able to prevent the movement of the adjusting screw and to guide smoothly the movements of the slant post base.

The adjusting screw is tightly engaged by the elastic member, so that fastening compound for preventing an unfastened state of the adjusting screw is eliminated, thereby greatly reducing the production cost.

Although the present invention has been shown and described with respect to preferred embodiments, various changes and modifications which are obvious to a person skilled in the art to which the invention pertains are deemed to lie within the spirit and scope of the following claims.

What is claimed is:

1. A slant post base mounting mechanism for a magnetic recording and reproducing apparatus having a slant post base with a protrusion located thereon, said slant post base mounting mechanism comprising:

a stopper having a substantially vertical portion with a substantially horizontal portion extending therefrom, said substantially horizontal portion having a hole extending therethrough and a generally v-shaped notch located thereon; and supporting means having a first portion, a second portion, and a third intermediate portion interconnecting said first portion and said second portion, said first portion having a hole extending therethrough for receiving an adjusting screw, said first portion providing an elastic force to said adjusting screw to prevent undesired movement of said adjusting screw, wherein said substantially vertical portion of said stopper includes an aperture extending therethrough, with said second portion of said supporting means extending through said aperture.

2. The slant post base mounting mechanism according to claim 1, wherein said first portion of said supporting means includes an elastic member, said hole in said first portion of said supporting means passing through said elastic member.

3. The slant post base mounting mechanism according to claim 1, wherein said second portion of said supporting means is locatable between an end of said adjusting screw and said protrusion of said slant post base.

4. The slant post base mounting mechanism according to claim 3, wherein said second portion of said supporting means contacts an end of said adjusting screw and said protrusion of said slant post base.

5. The slant post base mounting mechanism according to claim 3, wherein said second portion of said supporting means includes a slant portion which guides said second portion over said protrusion of said slant post base.

6. The slant post base mounting mechanism according to claim 1, wherein said first portion of said supporting means includes an elastic member, said hole in said first portion of said supporting means passing through said elastic member, and wherein said second portion of said supporting means is locatable between and contacts an end of said adjusting screw and said protrusion of said slant post base.

7. The slant post base mounting mechanism according to claim 6, wherein said second portion of said supporting means includes a slant portion which guides said second portion over said protrusion of said slant post base.

8. The slant post base mounting mechanism according to claim 1, wherein said aperture is rectangular.

9. The slant post base mounting mechanism according to claim 1, wherein said second portion of said supporting means comprises a guide portion which contacts the protrusion of the slant post base in order to support the adjusting screw, and a slant portion formed at an end of said guide portion.

10. The slant post base mounting mechanism according to claim 1, wherein said hole in said supporting means is aligned with said hole formed in said stopper.

* * * * *